United States Patent Office 3,037,353
Patented June 5, 1962

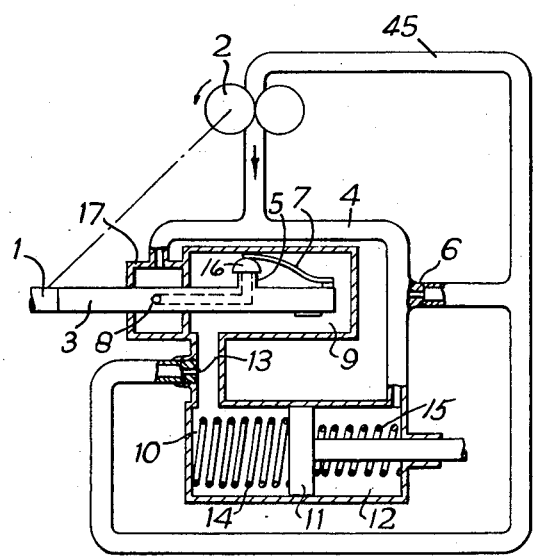

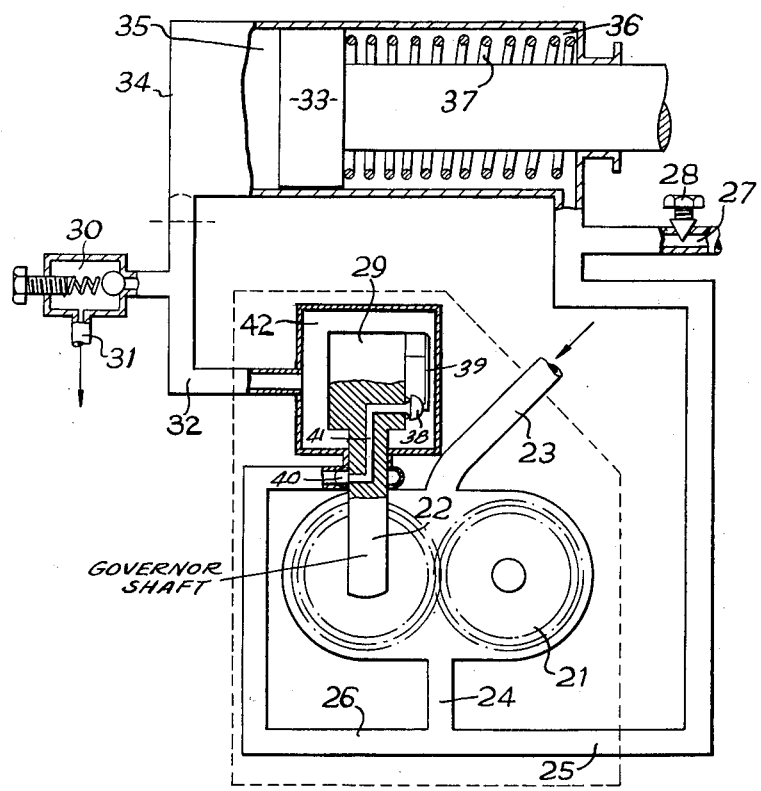

3,037,353
GOVERNOR-CONTROLLED HYDRAULIC
SYSTEMS
Norman Moss, London, and Michael John Broad, Enfield, England, assignors to the Plessey Company Limited, London, England, a British company
Filed Nov. 7, 1960, Ser. No. 67,862
Claims priority, application Great Britain Nov. 20, 1959
5 Claims. (Cl. 60—52)

This invention relates to centrifugal governors and has for an object to provide an improved governor system employing hydraulic servo operation, which is particularly intended for, though not limited to, use in connection with the constant-speed drive described in our co-pending U.S.A. patent application No. 38,671 filed June 24, 1960.

According to the invention a positive-displacement pump driven at substantially constant speed supplies liquid to a circuit which includes one branch leading to the pump inlet or to some other low-pressure point through a metering aperture, and a second branch, also leading to the low-pressure point, which contains a second metering aperture in series with a variable aperture, the latter being preferably arranged between the pump and the said second metering aperture, the variable aperture being controlled by a centrifugal element driven by a shaft of which the speed is to be kept constant, while a differential piston constituting the servomotor is subject on its smaller-area side to the pressure between the pump and the first aperture and on its larger-area side to the pressure between the variable aperture and the second metering aperture, the ratio between the two areas of the differential piston being such that the piston is balanced when the governor shaft rotates at the desired normal speed. If the speed increases, the opening of the variable aperture will increase (or decrease if the variable aperture is arranged between the second aperture and the low-pressure point), thus raising the pressure acting on the larger piston area in relation to that acting on the smaller piston area and causing the piston to move towards the smaller-area side until the controlling action of the piston has restored the predetermined shaft speed and the action of the two pressures upon the differential piston is thus again balanced. With the arrangement as so far described the governor is non-stable, that is to say any departure from the normal speed will cause the piston to move to one or the other of the ends of its stroke unless before it has reached such end the speed has returned to normal. If desired a spring or springs biasing the piston towards a normal position may be provided to render the arrangement stable, in which case a predetermined departure from normal speed will cause the piston to move a predetermined distance from its normal position, thus allowing the speed to become stabilised at a value differing from the normal speed according to the magnitude of the disturbing influence.

The centrifugal governor employed is preferably of a kind comprising a valve element normally held by spring pressure to close a radial aperture in a hollow governor shaft to the interior of which liquid is supplied from the pump, the centrifugal action of the valve itself, together with that of any supporting or attachment means, causing the valve to open against the spring action when a predetermined speed is exceeded.

With the construction described both sides of the differential piston are subject to pressures which vary as a function of the speed of the governor shaft. When it is desired to maintain the pressure at one side of the differential piston constant, according to a modified form of the present invention the second metering aperture may be replaced by a relief valve which is set to maintain the pressure at the larger-area side of the differential piston constant at a predetermined value, the variable aperture being so controlled by the centrifugal element that as the speed of the governor shaft increases, the pressure drop across the variable aperture decreases notwithstanding the increased flow through this aperture. As a result of this the effective pump delivery pressure and thus the pressure acting on the smaller-area side of the differential piston will likewise decrease when the speed of the governor shaft increases, thus resulting in a progressively increasing force tending to move the differential piston towards its smaller-area side.

The invention is illustrated by way of example in the drawings.

FIGURE 1 is a somewhat diagrammatic plan view of a governor system according to the present invention, while FIGURE 2 is a diagrammatic section illustrating an embodiment of the modified form of the invention.

Referring now first to FIGURE 1, a shaft 1, which is intended to be maintained at a predetermined normal speed, is coupled on the one hand to a gear pump 2 and on the other hand to a hollow governor shaft 3, which is conveniently either constituted by or arranged coaxially with the shaft 1 and/or with one of the shafts of the gear pump 2. The pump 2 delivers hydraulic liquid at a substantially constant rate to a pressure line 4, from which an amount dependent upon the pressure in line 4 is allowed to return to pump inlet line 45 through a first metering aperture 6. The interior of the hollow governor shaft 3 communicates through a rotary seal 7 and an aperture 8 with the pressure line 4 to admit the pressure liquid to a variable aperture constituting a valve seat 5 and valve element 16 co-operating therewith. The valve element is mounted on the shaft 3 by a spring 7 so as to rotate with the shaft and open when the centrifugal force acting on valve element 16 and on spring 7 and the differential action of the pressures at seat 5 and in a sealed chamber 9, in which the governor is accommodated, together exceed the action of the spring 7. The chamber 9 communicates with a chamber 10 at the larger-area side of a differential piston 11 while a similar chamber 12 at the smaller-area side of the piston 11 communicates with the pressure line 4, and a second metering aperture 13 allows liquid from chambers 9 and 10 to return to pump inlet 5 at a rate determined by the pressures prevailing in chambers 9 and 10. If desired two springs 14 and 15 may be interposed between the piston 11 and the outer ends of the chambers 10 and 12 respectively to ensure stability of the apparatus. When starting from zero speed, as long as the speed of the shaft 1 is lower than that at which the valve 16 begins to open, the pressure in chambers 9 and 10 will be substantially equal to pump inlet pressure, while the pressure in chamber 12 is equal to pump delivery pressure, and as a result the piston 11 will be moved towards the large-area side and will, independently of whether or not the spring 14 has been provided, reach the end of its stroke if the valve 16 remains closed. When the valve 16 begins to open, a pressure dependent upon the ratio of the aperture provided by the opened valve 16 to the aperture of the metering aperture 13 will develop in chambers 9 and 10, and the piston 11 will come to rest when the resulting pressure force on the large-area side of the piston, together with the action of the compressed spring 14 if provided, balances the action of the higher pressure in chamber 12 acting on the smaller area at the other side of piston 11. If no springs 14, 15 are provided, this balance can only be achieved when the shaft 1 has accurately resumed its normal speed, whereas if the springs 14 and 15 are provided, balance will be achieved not only at the normal speed, in which case the piston 11 comes to rest in its illustrated centre position, but also at speeds slightly higher or lower than the normal speed, in which case the piston will come to rest at a distance from its centre position, dependent on the magnitude of the speed deviation, and at one or the other side of the illustrated centre position according as the speed is higher or lower than normal, it being assumed that the valve 16 will not completely close until the piston 11 has reached its extreme low-speed position.

In the embodiment of FIGURE 2, a gear pump 21 driven by a governor shaft 22 forces oil or other liquid from an inlet 23 to a delivery outlet 24 having two branches 25 and 26. One branch 25 leads to a spill outlet 27 which is controlled by a metering aperture constituted by an adjustable bleed valve 28, while the other branch 26 passes through a reed-type governor 29 to a second spill aperture 31. The reed-type governor 29 is of similar construction to the governor shown in FIGURE 1. Liquid from line 25 is admitted through an annular chamber 40 to a passage 41 in the governor shaft 22. This passage leads to a valve seat co-operating with a half-ball valve member 38, the centrifugal effect of which is opposed by a leaf spring 39, liquid being spilled, when the valve 38 opens, from passage 41 into a housing chamber 42 enclosing the part of shaft 22 containing the valve member 38 controlled in such manner by a spring-loaded adjustable relief valve 30, that the pressure in a line 32 which leads from the chamber 42 of the reed type governor 29 to the relief valve 30 remains substantially constant.

A differential piston 33, which may be used for controlling a constant-speed drive as described in our said co-pending U.S.A. patent application No. 38,671 is arranged in a cylinder 34 of which the end chamber 35 facing the larger area side of the piston 33 communicates with the line 32 and is thus subject to a constant pressure, while the chamber 36 facing the smaller area side of the differential piston 33 is connected through branch line 25 to pump delivery and is thus maintained under pump delivery pressure, which is higher than the pressure in line 32 by the pressure drop in the reed-type governor 29. The chamber 36 further contains a spring 37 by means of which the piston 33 is stabilised at a predetermined position in the cylinder for any difference, within a predetermined range, of the hydraulic forces acting on the two sides of the piston. Assuming that the piston 33 is in balance at the centre of the cylinder 34 when the shaft 22 runs at the desired speed, any decrease in the speed of the shaft 22 will, by reducing the centrifugal action of valve 38 which opposes the effective pressure of spring 39, increase the pressure drop across the reed-type governor 29 and thus the pressure in chamber 36, causing the piston 33 to be displaced from the centre towards the large-area side of the piston 33 sufficiently to so vary the force of the spring 36 as to restore the balance of forces. Conversely an increase in the speed of shaft 22 will reduce the pressure drop in reed-type governor 29 and thereby produce a displacement of the piston 33 towards its smaller-area side until the increased force of the spring 37 makes up for the reduced pressure in chamber 36.

What we claim is:

1. In a governor-controlled hydraulic system for keeping the speed of a shaft substantially constant, the combination comprising a servomotor including a cylinder having two operating chambers and a piston sealingly movable in said cylinder, said piston having a first surface in one of said chambers and an oppositely facing second surface of smaller effective size in the other of said chambers, a positive-displacement pump having a low-pressure inlet and a high-pressure outlet, a valve having a valve seat, a valve element co-operating with said valve seat and spring means urging said element on to said seat, a centrifugal member driven by the shaft and centrifugally opposing the action of said spring means, a first hydraulic conduit leading from said outlet to a low-pressure point such as said inlet and including a first metering orifice, a second hydraulic conduit also leading from said outlet to said low-pressure point and including said valve seat in series with a second metering orifice, said one chamber of the cylinder communicating with a point of the second conduit between said valve seat and said second metering orifice, and the second chamber of the cylinder communicating with the pump outlet, the ratio between the effective sizes of the two piston surfaces being such that the piston is balanced when the shaft rotates at the desired speed.

2. A system as claimed in claim 1, wherein the valve is located in the second conduit between the pump outlet and the second metering aperture.

3. A system as claimed in claim 1, further comprising spring means biasing the piston towards a normal position to render the arrangement stable.

4. The modification of the governor-controlled hydraulic system claimed in claim 1, wherein the second metering aperture is replaced by a relief valve which is arranged between the pump and the valve and set to maintain the pressure at the larger-area side of the differential piston constant at a predetermined value.

5. A system as claimed in claim 1, including a hollow governor shaft having a radial aperture forming said valve seat and connected to said shaft for proportional rotation, and conduit means connecting said aperture to the said hollow shaft with the pump outlet, said valve element co-operating with said seat formed by the radial aperture and constituting at least a substantial part of said centrifugal means.

References Cited in the file of this patent

FOREIGN PATENTS 274,482     Great Britain _____ Dec. 15, 1927